US007145449B2

(12) United States Patent
Kim

(10) Patent No.: US 7,145,449 B2
(45) Date of Patent: Dec. 5, 2006

(54) VEHICLE SAFETY SYSTEM

(76) Inventor: Seong Woong Kim, 165-17 33rd Ave., Flushing, NY (US) 11358

( * ) Notice: Subject to any disclaimer, the term of this patent is extended or adjusted under 35 U.S.C. 154(b) by 40 days.

(21) Appl. No.: 10/841,348

(22) Filed: May 7, 2004

(65) Prior Publication Data
US 2004/0206292 A1 Oct. 21, 2004

Related U.S. Application Data

(63) Continuation-in-part of application No. 10/252,942, filed on Sep. 23, 2002, now Pat. No. 6,871,992.

(51) Int. Cl.
*B60Q 1/34* (2006.01)
(52) U.S. Cl. .................. 340/475; 340/463; 340/468; 340/471; 340/473; 340/479; 340/480
(58) Field of Classification Search ............... 340/475, 340/468, 478, 480, 463, 471, 473, 479, 433; 362/540, 541, 542, 372, 485, 488, 198, 287
See application file for complete search history.

(56) References Cited

U.S. PATENT DOCUMENTS

| 3,094,683 | A | 6/1963 | Watkins |
| 4,300,186 | A | 11/1981 | Hurd |
| 5,038,136 | A | 8/1991 | Watson |
| 5,406,250 | A | 4/1995 | Reavell et al. |
| 5,558,424 | A | 9/1996 | Zeligson |
| 5,980,070 | A | 11/1999 | Hulse et al. |
| 6,299,336 | B1 | 10/2001 | Hulse |
| 6,356,376 | B1 | 3/2002 | Tonar et al. |
| 6,426,696 | B1 | 7/2002 | Ortega |
| 6,728,393 | B1 * | 4/2004 | Stam et al. ................ 382/104 |
| 6,812,833 | B1 * | 11/2004 | Rothkop et al. ............ 340/475 |
| 2004/0057247 | A1 | 3/2004 | Kim |
| 2004/0114384 | A1 * | 6/2004 | Carter et al. |

OTHER PUBLICATIONS

Vintage Car Parts, "Trafficator 6 volts", May 24, 2006, <http://www.vintagecaraparts.co.uk/en/2267-trafficator+6+volt-details/> (2 pages printed on May 24, 2006).
Vintage Car Parts, "Trafficator arm", Jul. 5, 2003, <http://www.vintagecarparts.co.uk/part.phtml?PartID=1775>(1 page).

(Continued)

*Primary Examiner*—Hung Nguyen
(74) *Attorney, Agent, or Firm*—McCarter & English, LLP

(57) ABSTRACT

A turn indication system for a vehicle includes an indicating member movable between a first position and a second position in response to the actuation of a turn signal switch. A door-ajar indication system for a vehicle includes an indicating member movable between a first position and a second position in response to the actuation of a switch so as to indicate an ajar condition of a door of the vehicle. A traffic observation system for a vehicle includes a wave receiving member for mounting to the vehicle such that the wave receiving member is oriented along a line of sight from an object approaching the vehicle from a lateral direction generally perpendicular to a path of motion of the vehicle, permitting a driver of the vehicle to perceive the object via a wave received by the wave receiving member from the object along the line of sight.

15 Claims, 10 Drawing Sheets

OTHER PUBLICATIONS

International Search Report issued by the PCT Branch of the United States Patent and Trademark Office on Aug. 21, 2006, for International Patent Appln. No. PCT/US05/15881 (4 pages).

Written Opinion issued by the PCT Branch of the United States Patent and Trademark Office on Aug. 21, 2006, for International Patent Appln. No. PCT/US05/15881 (6 pages).

* cited by examiner

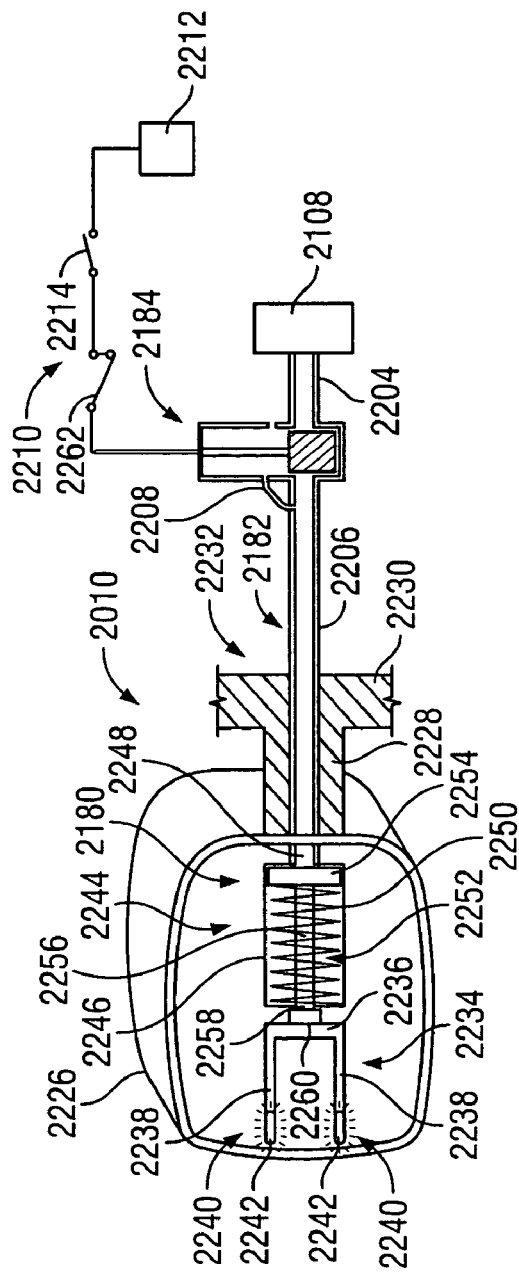
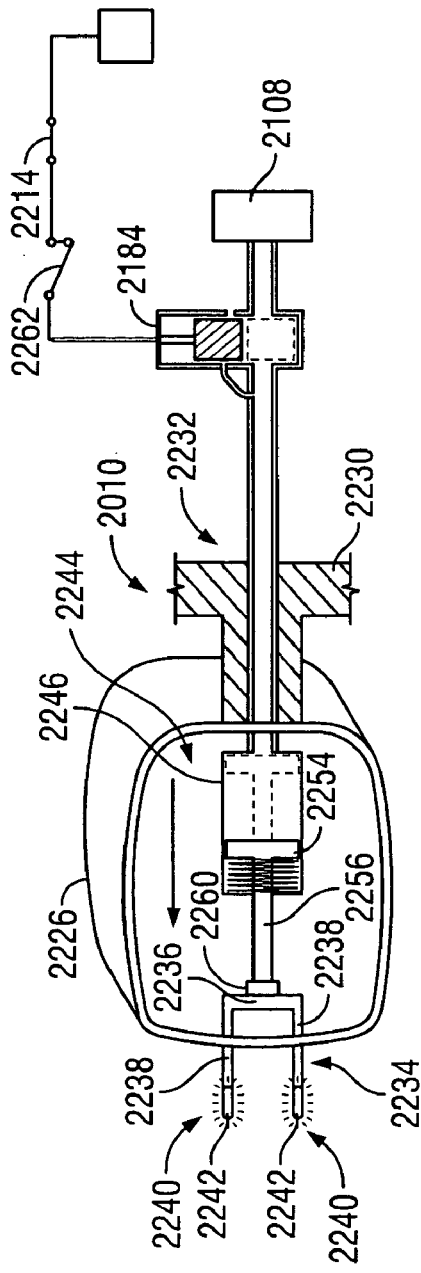
FIG. 14
FIG. 15

VEHICLE SAFETY SYSTEM

CROSS REFERENCE TO RELATED APPLICATIONS

This application is a continuation-in-part of U.S. patent application Ser. No. 10/252,942, filed Sep. 23, 2002, now U.S. Pat. No. 6,871,992 the disclosure of which is hereby incorporated by reference herein in its entirety.

FIELD OF THE INVENTION

The present invention relates to vehicle safety systems and, more particularly, to safety systems for automobiles.

BACKGROUND OF THE INVENTION

Automobiles have a brake light system typically equipped with a pair of rear brake lights and a third brake light. These lights are activated (i.e., turned on) in response to the depression of an associated brake pedal by a driver. While these lights are adapted to signal the activation of the brake system to other drivers, they do not indicate the extent to which the brake pedal is depressed. In such circumstances, there is a need for a brake light system adapted to indicate the extent to which an associated brake system is actuated or engaged.

Automobiles also have turn signal systems typically equipped with a pair of front turn signal lights, and a pair of rear turn signal lights. These lights are typically activated (i.e., turned on) in response to the actuation of a lever-type switch by a driver. While these lights are adapted to indicate to other drivers and onlookers that the driver intends to commence a turn, they are not always advantageously positioned such that all other nearby drivers and onlookers are provided with adequate advance knowledge of the turn. Accordingly, there is a need for a turn signal system capable of indicating impending vehicle turns to those drivers and other onlookers with respect to which conventional front and rear turn signal lights are not advantageously positioned.

Still other potentially hazardous roadway traffic situations give rise to the need for additional vehicle safety systems. For example, although many vehicles include indicators which signal to the driver of a vehicle the fact that one or more of the doors of the vehicle have become ajar, the drivers of other vehicles are not typically notified. Especially at night, or at twilight, other drivers may not be readily able to perceive, for example, that a front or rear door of a stopped car they are passing (e.g., a car stopped on a narrow highway "shoulder") is opened towards traffic. As such, there is a need for a door-ajar indication system for providing drivers of other vehicles with this important information.

For another example, when approaching, entering, and/or attempting to cross a busy, narrow, and/or congested roadway, a driver of a vehicle may find, to his or her frustration, that a direct view of part of that roadway, or even of most of that roadway, is blocked by one or more obstructions (e.g., parked cars or trucks, hedges, signs, etc.), or for some reason the driver's view of approaching vehicles is inadequate. In such situations, the driver may not learn of the presence of an approaching vehicle until it is too late to avoid a traffic mishap. Accordingly, vehicle safety systems are needed which are capable of providing a driver with one or more suitable alternative vantage points (e.g., an indirect vantage point) and/or methods of observing and/or perceiving approaching vehicles not readily or directly viewable by the driver.

SUMMARY OF THE INVENTION

The present invention overcomes the disadvantages and shortcomings of the prior art discussed above by providing a new and improved brake light system for a vehicle. More particularly, the brake light system includes an indicating member movable between a first position and a second position, which is different from the first position. The indicating member is movable from its first position to its second position in response to the actuation of a brake system of the vehicle. In accordance with one feature of the present invention, the indicating member is movable pneumatically from its first position to its second position. The indicating member is movably mounted in an opening of a base member. The opening is sized and shaped so as to be pressurized in response to the actuation of the brake system such that the indicating member is movable to any one of an infinite number of positions between its first position and its second position in response to the pressurization of the opening so as to indicate the extent of engagement of the brake system. The indicating member is positioned in the opening when it is in its first position and extends outwardly from the base member when it is in its second position. The brake light system also includes a pressurized gas source for supplying pressurized gas to the opening of the base member.

The present invention overcomes other disadvantages and shortcomings of the prior art discussed above by providing a new and improved turn indication system for a vehicle. More particularly, the turn indication system includes an indicating member movable between a first position and a second position, which is different from the first position. The indicating member is movable from its first position toward its second position in response to the actuation of a turn signal switch in order to indicate a change to a direction of movement of the vehicle.

The present invention overcomes further disadvantages and shortcomings of the prior art discussed above by providing a new and improved door-ajar indication system for a vehicle. More particularly, the door-ajar indication system includes an indicating member movable between a first position and a second position, which is different from the first position. The indicating member is movable from its first position toward its second position in response to the actuation of a switch so as to indicate an ajar condition of a vehicle door.

The present invention overcomes still further disadvantages and shortcomings of the prior art discussed above by providing a new and improved traffic observation system for a vehicle. More particularly, the traffic observation system includes a wave receiving member configured for mounting to a vehicle such that the wave receiving member is oriented along a line of sight from an object approaching the vehicle from a lateral direction generally perpendicular to a path of motion of the vehicle. In accordance with the inventive traffic observation system, the vehicle's driver is permitted to perceive the object via a wave received by the wave receiving member from the approaching object along the line of sight.

BRIEF DESCRIPTION OF THE DRAWINGS

For a better understanding of the present invention, reference is made to the following detailed description of an exemplary embodiment of the present invention, considered in conjunction with the accompanying drawings, in which:

FIG. 14 is a schematic view of a vehicle turn indication system constructed in accordance with the present invention and shown in a non-deployed state;

FIG. 15 is a view identical to FIG. 14, except that the indication member of the vehicle turn indication system is shown in an extended or deployed state;

DETAILED DESCRIPTION OF THE INVENTION

Although the present invention can be used in conjunction with any type of motorized or non-motorized vehicle, it is particularly suitable for use in connection with motor vehicles, such as an automobile. Accordingly, the present invention will be described hereinafter in connection with an automobile. It should be understood, however, that the following description is only meant to be illustrative of the present invention and is not meant to limit the scope of the present invention, which has applicability to other types of motorized or non-motorized vehicles (e.g., motorcycles, bicycles, trains, etc.).

Figures 1, 2:
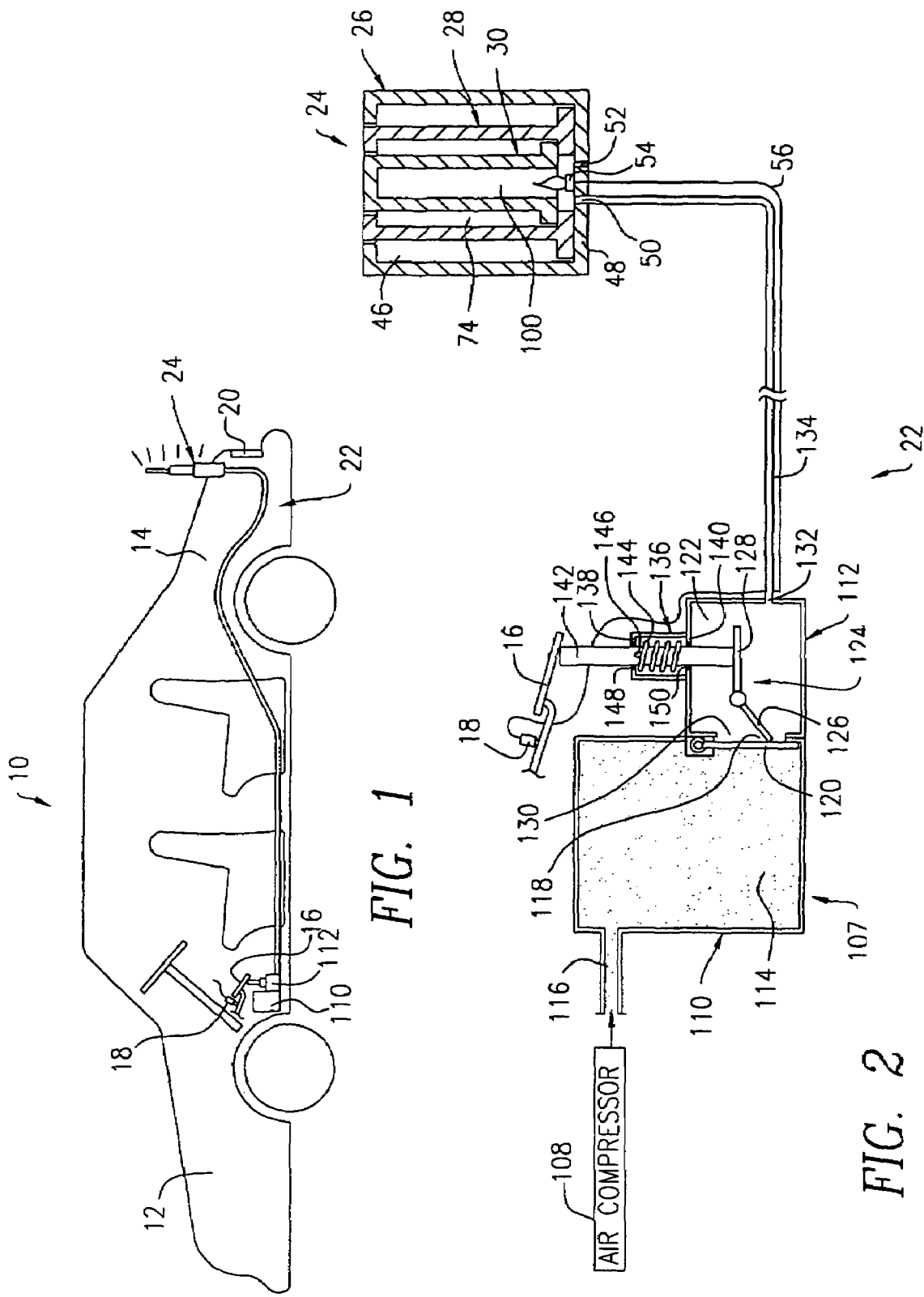
FIG. 1 is a simplified view of an automobile equipped with a brake light system constructed in accordance with the present invention.
FIG. 2 is a schematic view of a brake light system shown in FIG. 1, a brake pedal of the automobile being in a non-depressed state.
Figure 3:
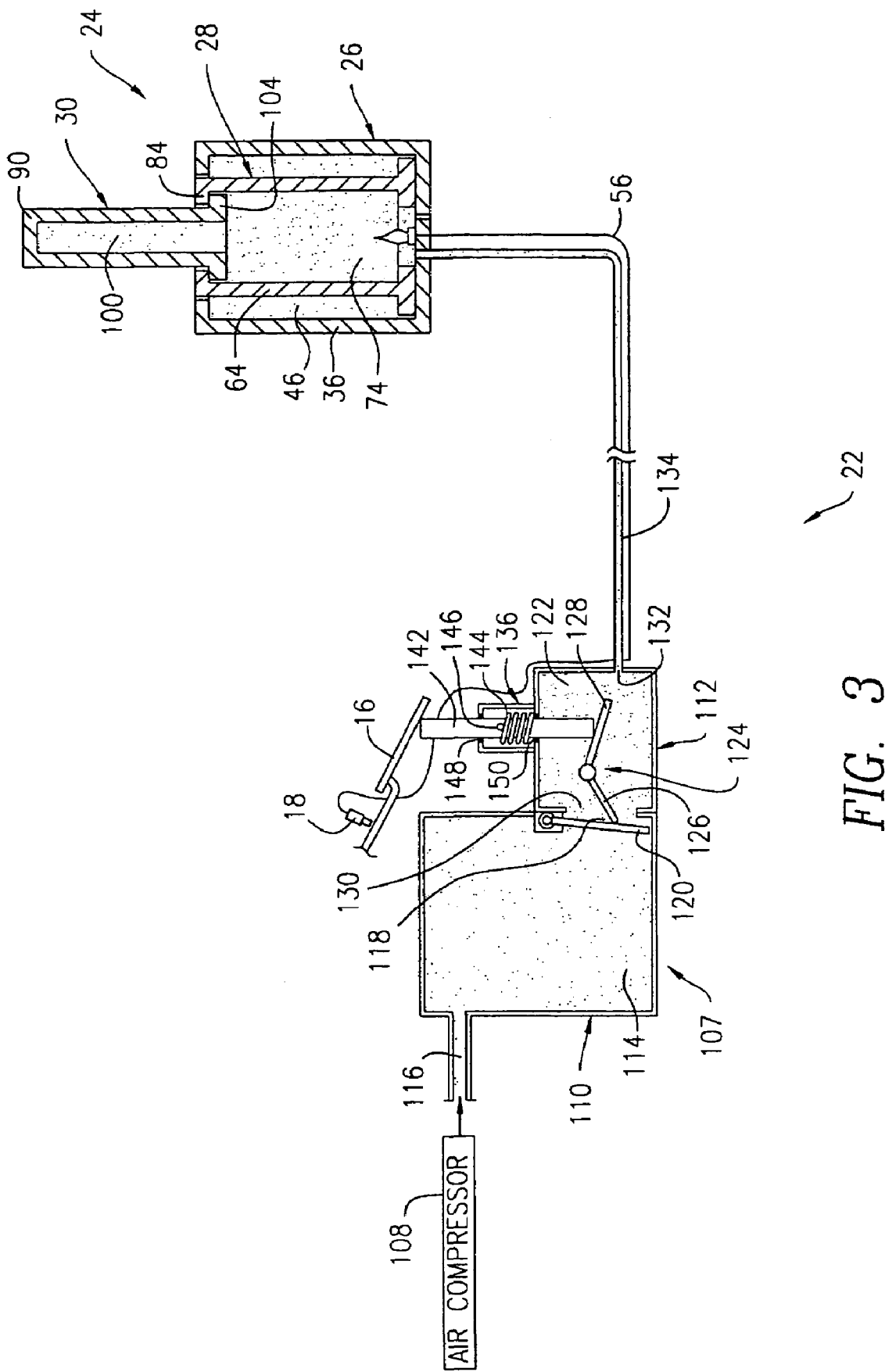
FIG. 3 is a view identical to FIG. 2, except that the brake pedal is in a partially depressed state.

Referring to FIGS. 1 and 2, there is shown an automobile 10 having a front end 12 and a rear end 14. The automobile 10 also includes a conventional brake system equipped with a brake pedal 16, a brake light actuator 18 and rear brake lights 20 mounted to the rear end 14 of the automobile 10. As is conventional in the automotive field, when the brake pedal 16 is depressed by a driver, the brake light actuator 18 activates the rear brake lights 20 to indicate the actuation of the brake system.

With reference to FIGS. 1, 2, 5 and 6, the automobile 10 is equipped with a brake light system 22 constructed in accordance with the present invention. More particularly, the brake light system 22 includes a telescoping signal unit 24 mounted proximate to the rear end 14 of the automobile 10. The telescoping signal unit 24 has a base member 26, an intermediate member 28 and an inner member 30. The base member 26, which is fixedly attached to the rear end 14, has front and rear sides 32, 34 (see FIG. 6) and is provided with a cylindrical wall 36 having an inner surface 38, and an open upper end 40 and a lower end 42 (see FIG. 5). The inner surface 38 has a pair of keys 44 (see FIG. 6) elongated vertically and projecting radially inwardly for purposes to be discussed hereinafter. An opening 46 is formed in the cylindrical wall 36 between the upper end 40 and a lower end 42, while a bottom plate 48 is attached to the lower end 42 of the cylindrical wall 36. The bottom plate 48 is equipped with an inlet 50 for supplying compressed air to the opening 46 and an outlet 52 for releasing same from the opening 46. A light bulb 54 is mounted on the bottom plate 48 and is connected to the brake light actuator 18 via an electrical line 56 for illuminating the telescopic signal unit 24. The base member 26 also has an annular flange 58 which extends radially inwardly from the upper end 40 of the cylindrical wall 36.

Now referring primarily to FIGS. 3–6, the intermediate member 28 has front and rear sides 60, 62 and is provided with a cylindrical wall 64 having outer and inner surfaces 66, 68 and open upper and lower ends 70, 72. An opening 74 is formed in the cylindrical wall 64 between the upper and lower ends 70, 72. The inner surface 68 of the intermediate member 28 has a pair of keys 78 elongated vertically and projecting radially inwardly for purposes to be discussed hereinafter. The intermediate member 28 is also provided with a lower annular flange 80, which extends radially outwardly from the lower end 72 of the cylindrical wall 64, and a lower annular flange 82, which extends radially inwardly from the lower end 72 of the cylindrical wall 64. The lower annular flange 80 has a pair of notches 76 (see FIG. 6), each of which receives a corresponding one of the keys 44 of the base member 26 so as to prevent rotational movement of the intermediate member 28 relative to the base member 26. The upper end 70 of the intermediate member 28 is also provided with an upper annular flange 84 extending radially inwardly therefrom.

The intermediate member 28 is movably mounted in the base member 26. More particularly, the intermediate member 28 is movable between a retracted position, in which the intermediate member 28 is positioned in the opening 46 concentrically with the base member 26 (see FIG. 2), and an extended position, in which the intermediate member 28 extends vertically upwardly from the base member 26 through the open upper end 40 (see FIG. 4). In this regard, the lower annular flange 80 of the intermediate member 28 is sized and shaped so as to engage the annular flange 58 of the base member 26 and to hence prevent the intermediate member 28 from moving beyond its extended position (see FIG. 4).

Still referring to FIGS. 3–6, the inner member 30 has front and rear sides 86, 88 and is provided with a cylindrical wall 90 having outer and inner surfaces 92, 94, a closed upper end 96 and an open lower end 98. An opening 100 is formed in the cylindrical wall 90 between the upper and lower ends 96, 98. The lower end 98 of the inner member 30 has an annular flange 104 extending radially outwardly from the cylindrical wall 90. The annular flange 104 of the inner member 30 is provided with a pair of notches 102 (see FIG. 6), each of which receives a corresponding one of the keys 78 of the intermediate member 28 so as to prevent rotational movement of the inner member 30 relative to the intermediate member 28 and hence the base member 26.

The inner member 30 is movably mounted in the intermediate member 28. More particularly, the inner member 30 is movable between a retracted position, in which the inner member 30 is positioned in the opening 74 of the intermediate member 28 in a concentric manner (see FIGS. 2 and 6), and an extended position, in which the inner member 30 extends vertically upwardly from the intermediate member 28 through its open upper end 70 (see FIG. 4). In this regard, the annular flange 104 of the inner member 30 is sized and shaped so as to rest on the lower annular flange 82 of the intermediate member 28 when the inner member 30 is in its retracted position (see FIGS. 2 and 6). The annular flange 104 is also adapted to engage the upper annular flange 84 of the intermediate member 28 so as to prevent the inner member 30 from moving beyond its extended position.

Figure 5:
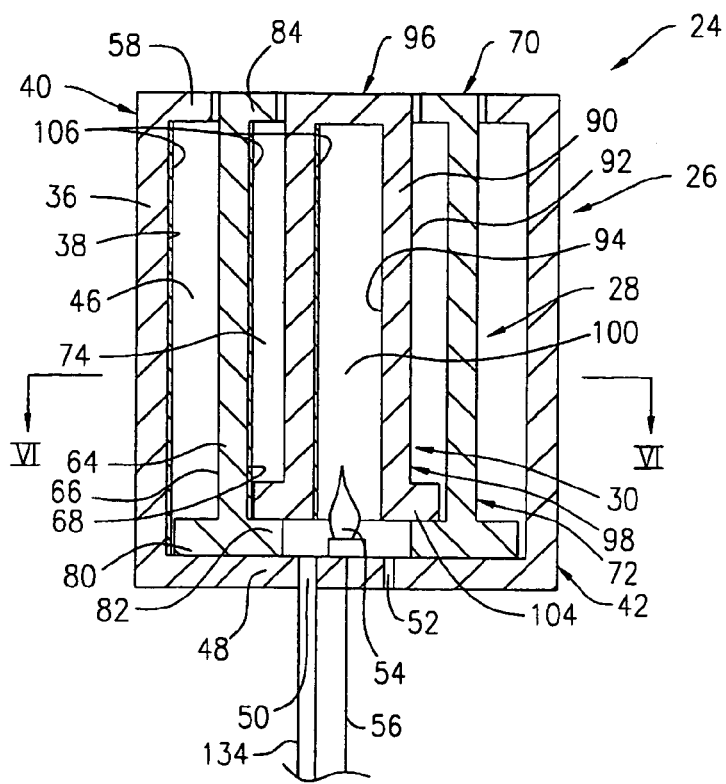
FIG. 5 is an enlarged cross-sectional view of a telescoping signal unit of the brake light system shown in FIG. 2.
Figure 6:
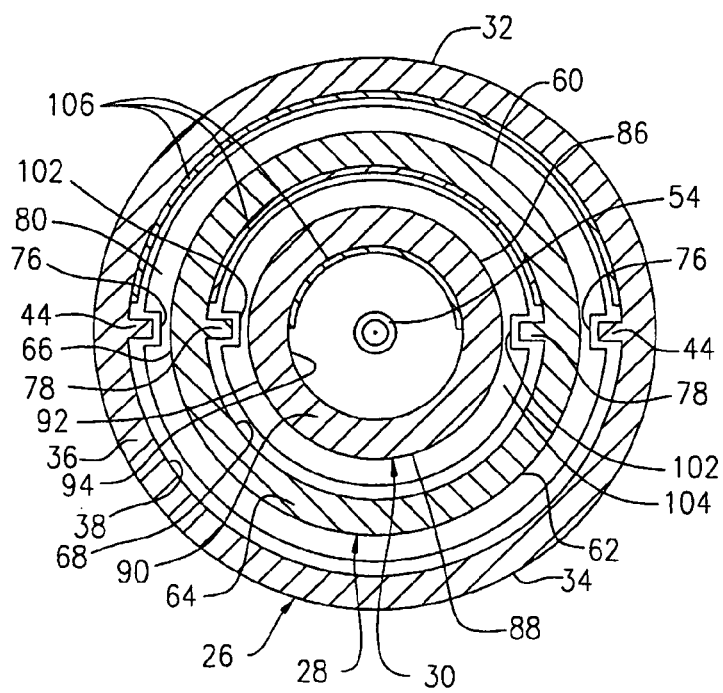
FIG. 6 is a cross-sectional view, taken along section line VI—VI and looking in the direction of the arrows, of the telescoping signal unit of the brake light system shown in FIG. 5.
Figure 7:
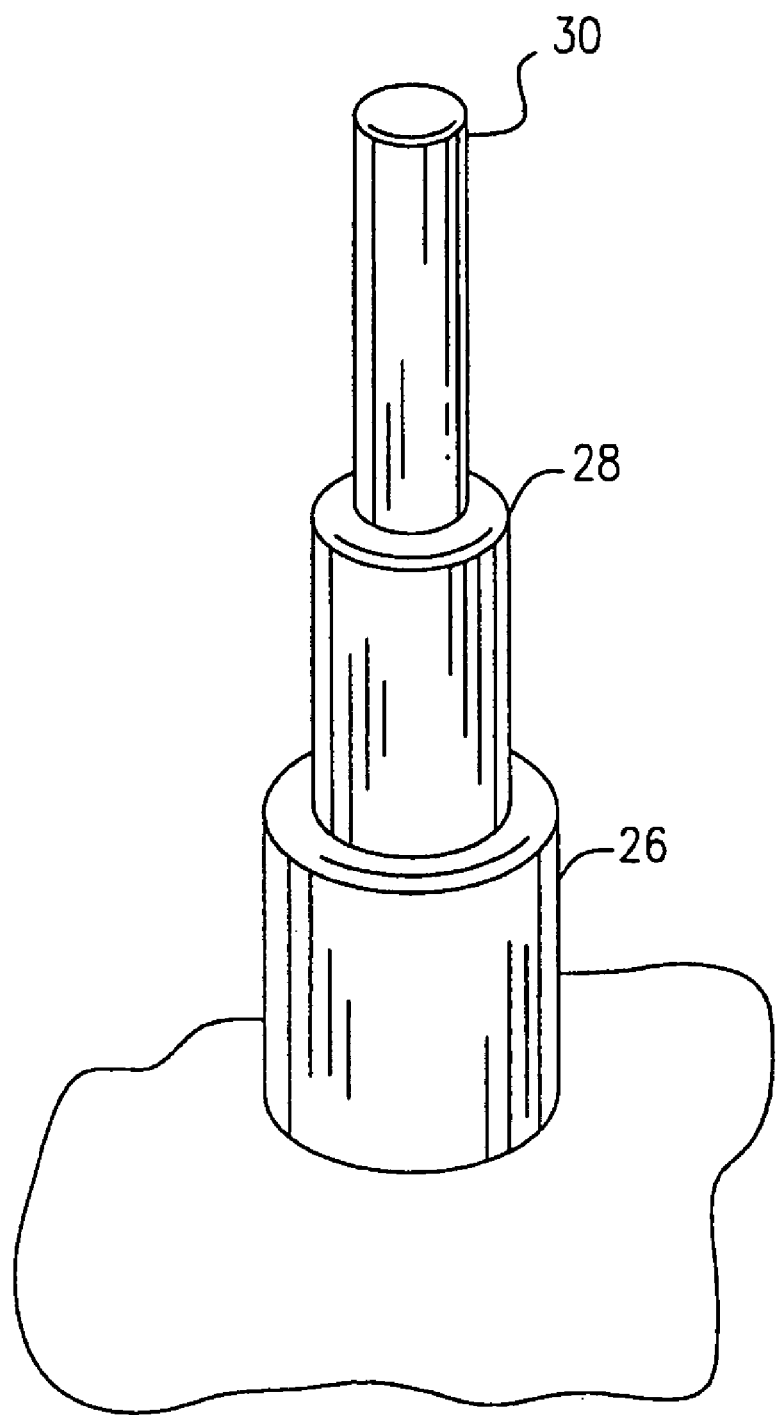
FIG. 7 is a perspective view of the telescoping signal unit of the brake light system shown in FIG. 4.

With reference to FIGS. 5–7, the cylindrical walls 36, 64, 90 of the base member 26, the intermediate member 28 and the inner member 30, respectively, are made from a suitable material (e.g., a translucent material or a conventional material used to make a red-colored cover for a rear brake light) such that, when the light bulb 54 is activated (i.e., turned on), the telescoping signal unit 24 can be illuminated. In this regard, the inner surfaces 38, 68, 94 of the base member 26, the intermediate member 28 and the inner member 30, respectively, are coated with a suitable material 106 (e.g., an opaque or reflective material) at their front sides 32, 60, 86, respectively, to prevent the light emitted from the light bulb 54 from being transmitted toward the front end 12 of the automobile 10 and hence from distracting the driver of the automobile 10. Alternatively, discrete or separate layers of opaque or reflective material can be attached (e.g., glued) to the inner surface 38 and/or the outer surface of the base member 26, the inner and/or outer surfaces 68, 66 of the intermediate member 28 and the inner and/or outer surfaces 94, 92 of the inner member 30.

Referring back to FIGS. 1 and 2, the brake light system 22 also includes a compressed air supply system 107 having a pressurized air source (e.g., an air compressor) 108, a supply tank 110 and an outlet tank 112, all of which are mounted in or on the automobile 10. The supply tank 110 has a chamber 114 and an inlet 116 connected to the air compressor 108 for conveying a constant supply of pressurized air from the air compressor 108 to the chamber 114. The supply tank 110 also has an outlet 118 for supplying pressurized air to the outlet tank 112. A spring-loaded valve plate 120 is pivotally attached to the supply tank 110 for opening and closing the outlet 118. More particularly, the valve plate 120 is pivotable between a fully open position (see FIG. 4), in which the valve plate 120 is disengaged from the outlet 118 so as to permit pressurized air to flow from the supply tank 110 to the outlet tank 112 through the outlet 118, and a closed position (see FIG. 2), in which the valve plate 120 is engaged with the outlet 118 so as to inhibit flow of pressurized air to the outlet tank 112.

Referring primarily to FIG. 2, the outlet tank 112 has a chamber 122 and a lever 124 mounted in the chamber 122. The lever 124 has an actuating section 126 located adjacent to the valve plate 120 and a rod-engaging section 128 extending away from the actuation section 126. The lever 124 is pivotable between an extended position, in which the actuating section 126 pushes the valve plate 120 to its open position (see FIG. 4), and a retracted position, in which the actuating section 126 permits the valve plate 120 to be positioned in its closed position (see FIG. 2). The outlet tank 112 also includes an inlet 130, which is in communication with the outlet 118 of the supply tank 110 for receiving pressurized air therefrom, and an outlet 132, which is connected to the inlet 50 of the telescoping signal unit 24 via a hose 134.

A rod housing 136 is formed on the outlet tank 112 and includes an upper opening 138, a lower opening 140 and an actuator rod 142 mounted to the housing 136 and extending through the upper and lower openings 138, 140. The actuator rod 142 is movable relative to the housing 136 between an upper position (see FIG. 2) and a lower position (see FIG. 4). A spring 144 is mounted on the actuator rod 142 for urging same toward its upper position, while a pin 146 is position on the actuator rod 142 for compressing the spring 144 as the actuator rod 142 moves from its upper position toward its lower position. Sealing members 148, 150 are also mounted in the upper and lower openings 138, 140, respectively, so as to form an air-tight seal between the rod 142 and the housing 136 and hence inhibit pressurized air from venting through the lower and upper openings 140, 138.

In operation, the supply tank 110 is constantly pressurized by a continuous supply of pressurized air from the air compressor 108. When the brake pedal 16 is depressed by a driver to actuate the brake system of the automobile, the brake light actuator 18 activates the light bulb 54 of the telescoping signal unit 24 and the rear brake lights 20. As the brake pedal 16 is depressed, it pushes the actuator rod 142 downwardly so as to cause same to move from its upper position (see FIG. 2) toward its lower position (see FIG. 3). In response, the actuator rod 142 causes the lever 124 to pivot from its retracted position toward its extended position and hence causes the valve plate 120 to move from its closed position (see FIG. 2) toward its open position (see FIG. 3). As a result, pressurized air flows from the supply tank 110 to the telescoping signal unit 24 through the outlet tank 112 and the hose 134 so as to pressurize the opening 46 of the base member 26. As the opening 46 of the base member 26 becomes pressurized, the inner member 30 moves from its retracted position (see FIG. 2) to its extended position (see FIG. 3). As a result, the cylindrical wall 90 of the inner member 30 extends upwardly from the base member 26 and hence becomes visible so as to indicate that the brake pedal 16 is depressed.

Figure 4:
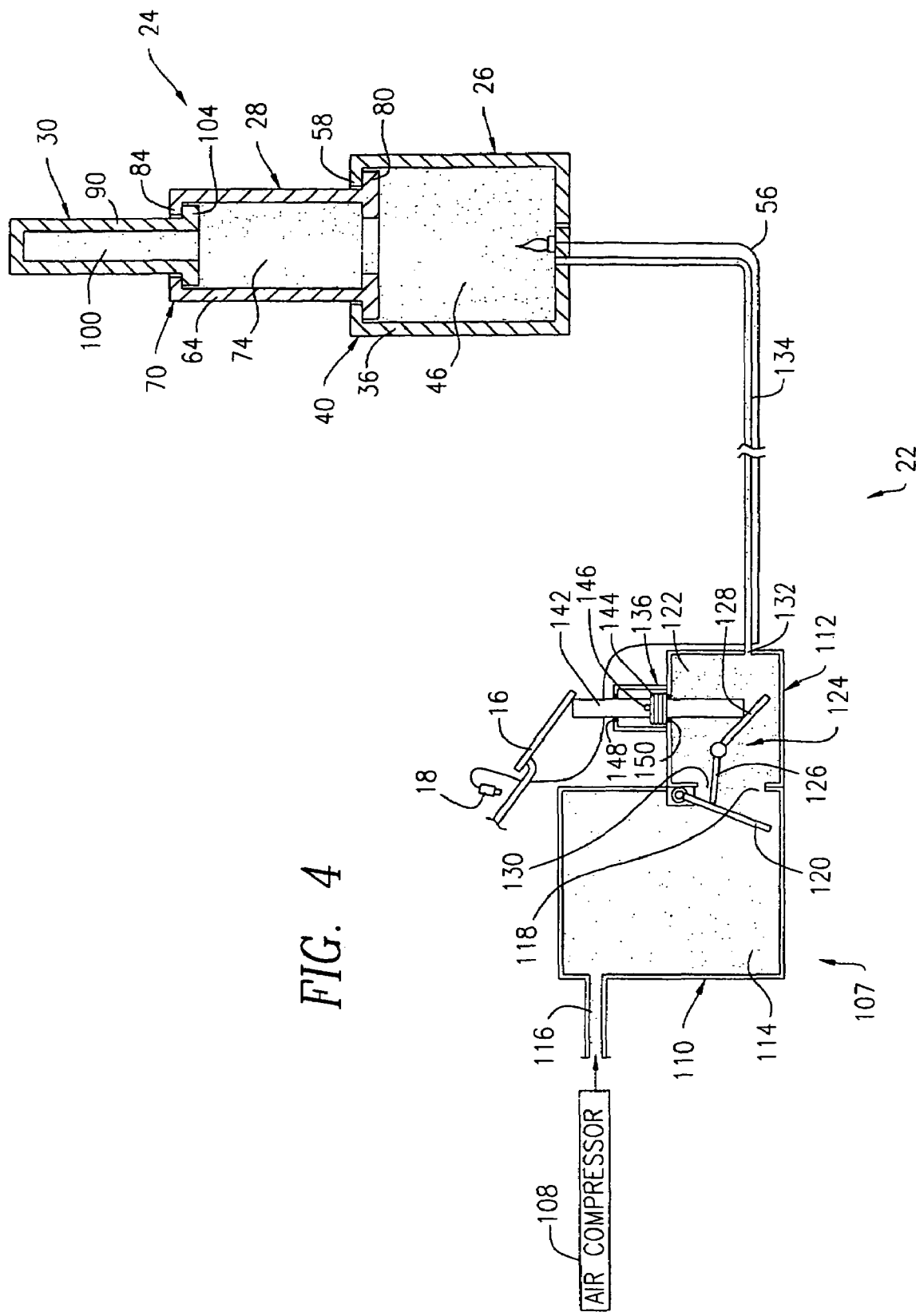
FIG. 4 is a view identical to FIG. 2, except that the brake pedal is in a fully depressed state.

When the brake pedal 16 is fully depressed, the actuator rod 142 is moved to its lower position, thereby causing the valve plate 120 to move to its fully open position (see FIG. 4). As a result, more pressurized air flows from the supply tank 110 to the telescoping signal unit 24, thereby fully pressurizing the opening 46 of the base member 26. In response, the intermediate member 28 moves from its retracted position (see FIG. 3) to its extended position (see FIG. 4). As a result, the cylindrical wall 64 of the intermediate member 28 extends outwardly from the base member 26 and hence becomes visible so as to indicate that the brake pedal 16 is fully depressed. The degree to which the telescoping signal unit 24 projects upwardly (i.e., the upward movement of the inner and intermediate members 30, 28 relative to the base member 26) is determined by the extent to which the brake pedal 16 is depressed. More particularly, the valve plate 120 is movable to one of an infinite number of positions between its open and closed positions in response to the depression of the brake pedal 16 and hence causes the intermediate and inner members 28, 30 to move to any one of an infinite number of positions between their retracted and extended positions. As a result, the telescoping signal unit 24 is adapted to accurately indicate the extent of depression of the brake pedal 16 and hence the extent of actuation of the brake system of the automobile 10. In this regard, the air compressor 108 is adapted to maintain the pressure in the chamber 114 at a predetermined pressure level sufficient to cause the intermediate member 28 and the inner member 30 to move to their extended positions when the pressurized air is supplied to the telescoping signal unit 24.

When the brake pedal 16 is released, the spring 144 causes the actuator rod 142 to move upwardly from its lower position to its upper position, and the lever 124 pivots back to its retracted position. As a result, the valve plate 120 moves from its open position (see FIG. 4) to its closed position (see FIG. 2), thereby inhibiting pressurized air from flowing from the supply tank 110 to the telescoping signal unit 24. Pressurized air contained in the telescoping signal unit 24 is vented through the outlet 52. As a result, the inner member 30 and the intermediate member 28 move from their extended positions to their retracted positions.

It should be noted that the present invention can have numerous variations and modifications. For instance, the telescoping signal unit 24 can be mounted anywhere on the automobile 10, provided that it is visible to other drivers. The telescoping signal unit 24 can also be mounted in different orientations such that the intermediate and/or inner members 28, 30 are movable in different directions (e.g., in a horizontal direction or in a vertically downward direction). In addition, more than one telescoping signal 24 units can be mounted on a vehicle. Moreover, the telescoping signal unit 24 can be illuminated by other source of light (e.g., an LED, a halogen bulb, fiber optics). The brake light system 22 can also utilize other mechanisms to move the telescoping signal unit 24 (e.g., a mechanical system, a vacuum system, an electrical system, etc.). In addition, the valve plate 120 can be freely pivotable (i.e., not spring-loaded) without affecting the utility or function of the present invention.

A second exemplary embodiment of the present invention is illustrated in FIGS. 8–11. Elements illustrated in FIGS. 8–11 which correspond substantially to the elements described above with reference to FIGS. 1–7 have been designated by corresponding reference numerals increased by one thousand. The embodiment of the present invention shown in FIGS. 8–11 operates and is constructed in manners consistent with the foregoing description of the embodiment of FIGS. 1–7, unless it is stated otherwise.

Figure 8:
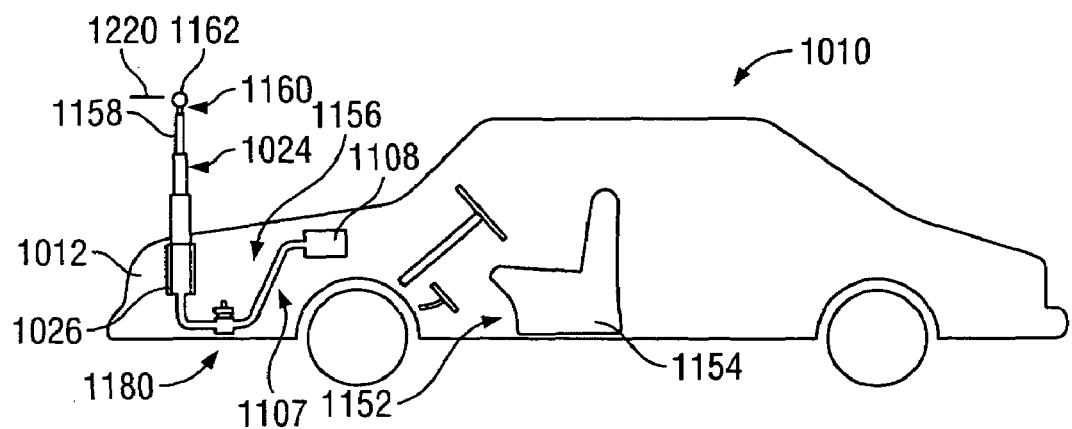
FIG. 8 is a is a simplified view of an automobile equipped with a traffic observation system constructed in accordance with the present invention.
Figure 9:
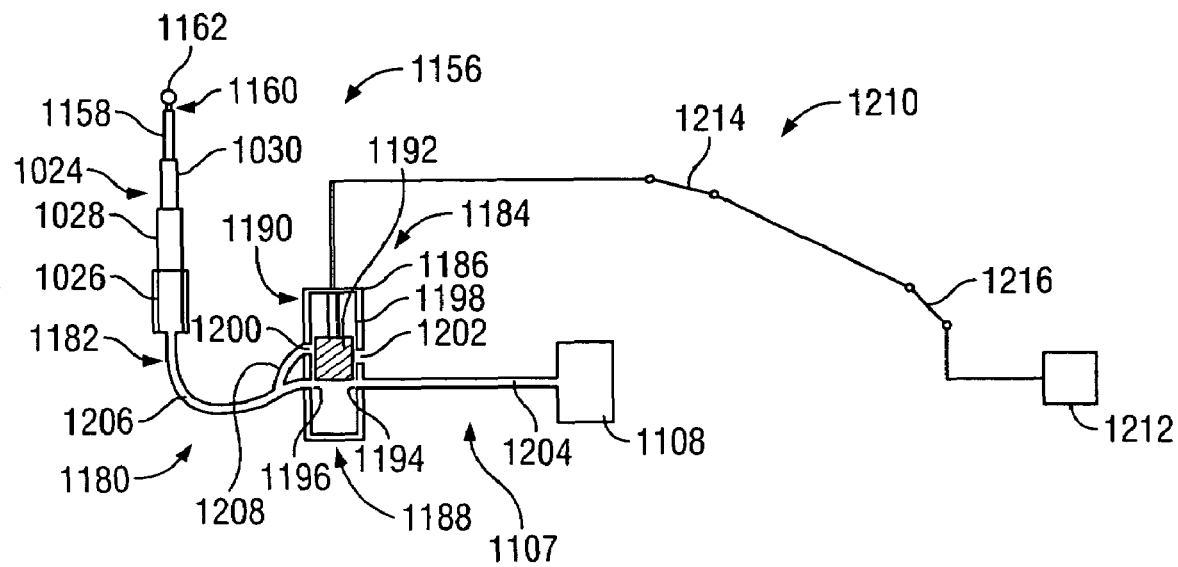
FIG. 9 is a schematic view of the traffic observation system shown in FIG. 8, a reflection member of the traffic observation system being shown in an extended or deployed state.
Figure 10:
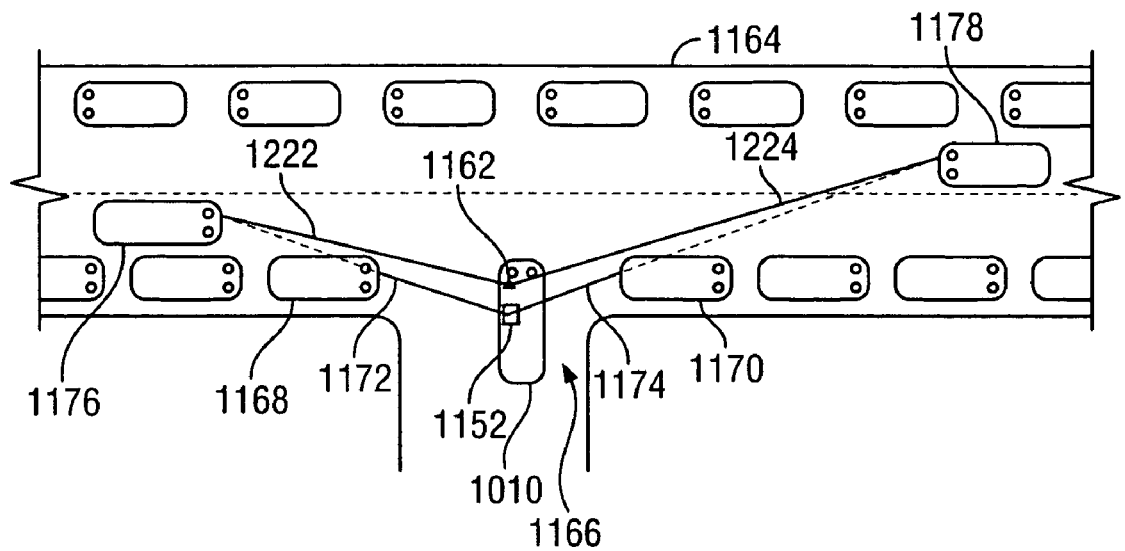
FIG. 10 is a schematic top view of the automobile shown in FIG. 8, wherein the automobile is stopped at an entrance to a roadway prior to entering the roadway.

Referring to FIGS. 8 and 9, there is shown an automobile 1010 having a front end 1012 and a driver's station 1152 including a seat 1154 for the driver (not shown) of the automobile 1010. The automobile 1010 is equipped with a traffic observation system 1156 mounted proximate to the front end 1012 of the automobile 1010. More particularly, the traffic observation system 1156 includes a reflection member 1158 having an end 1160, and a mirror 1162 mounted to the end 1160 of the reflection member 1158 for reflecting images of approaching vehicles to the driver seated in the seat 1154 at the driver's station 1152. As will be discussed further hereinafter, the reflection member 1158 is movably mounted to the automobile 1010 so that the elevation of the mirror 1162 can be changed by the driver so as to provide an indirect (e.g., via reflection) view of approaching vehicles that the driver cannot obtain directly (e.g., via line-of-sight observation). An example of such a traffic situation (e.g., a situation in which the driver's line-of-sight vantage point is so impaired) is shown in the FIG. 10 overhead view of a roadway 1164, in which the automobile 1010 is shown at an entrance 1166 to the roadway 1164. As shown in FIG. 10, other vehicles 1168, 1170 (e.g., trucks and/or other large and/or inconveniently positioned vehicles) parked on the roadway 1164 block what would otherwise be unobstructed line-of-sight views 1172, 1174 by the driver of the automobile 1010 of moving vehicles 1176, 1178 on the roadway 1164 that are approaching the entrance 1166, e.g., effectively preventing the driver from observing such approaching vehicles 1176, 1178 directly from the driver's station 1152.

The traffic observation system 1156 further includes an actuation system 1180 mounted within the front end 1012 of the automobile 1010 for alternatively elevating and lowering the reflection member 1158 relative to the automobile 1010. More particularly, the actuation system 1180 includes a telescoping unit 1024 having a base member 1026 mounted in or on the automobile 1010 proximate to the front end 1012 of the automobile 1010, and a compressed air supply system 1107 for pneumatically actuating the telescoping unit 1024. The compressed air supply system 1107 includes a pressurized air source (e.g., an air compressor) 1108, a conduit 1182 (see FIG. 9) for pneumatically coupling the pressurized air source 1108 to the base member 1026 of the telescoping unit 1024, and a solenoid valve 1184 (see FIG. 9) disposed between the pressurized air source 1108 and the telescoping unit 1024 for permitting the conduit 1182 to be selectively opened, all of which are mounted in or on in the automobile 1010.

With reference to FIG. 9, the solenoid valve 1184 has a construction and operation similar in most respects to conventional solenoid valves. For example, the solenoid valve 1184 is a two-way electrically-powered solenoid valve that is biased closed and has a body 1186 which includes a valve seat 1188 and a reciprocation chamber 1190, and a plunger 1192 disposed within the reciprocation chamber 1190 for reciprocating motion therein so as to alternatively seat within the valve seat 1188 (thereby "closing" the solenoid valve 1184) and retract away therefrom (thereby "opening" the solenoid valve 1184). The valve seat 1188 includes a compressed air inlet 1194 and a compressed air outlet 1196, while the reciprocation chamber 1190 includes an upper portion 1198 including a bleed air inlet 1200 and a bleed air outlet 1202. As is done conventionally, when powered, the solenoid valve 1184 actuates toward an "open" configuration (see FIG. 9) in which its plunger 1192 is caused to retract away from the valve seat 1188, and when deprived of power, the solenoid valve 1184 actuates via a biasing element (not shown) (e.g., a spring) toward a "closed" configuration (see FIG. 11) in which its plunger 1192 is caused to extend into and seat within the valve seat 1188.

The conduit 1182 includes a first conduit portion 1204 pneumatically disposed between the pressurized air source 1108 and the compressed air inlet 1194 of the valve seat 1188, and a second conduit portion 1026 disposed between the compressed air outlet 1196 of the valve seat 1188 and the base member 1206 of the telescoping unit 1024. A pressure relief line 1208 is also provided, the pressure relief line 1208 being pneumatically disposed between the second conduit portion 1206 and the bleed air inlet 1200 of the upper portion 1198 of the reciprocation chamber 1190.

The traffic observation system 1156 further includes a power supply circuit 1210 (see the schematic illustration of same in FIG. 9) within the automobile 1010, the power supply circuit 1210 generally being of a conventional structure and function so as to provide power for operating the solenoid valve 1184. For example, the power supply circuit 1210 includes a power supply (e.g., a battery) 1212 electrically coupled to the solenoid valve 1184. The power supply circuit 1210 further includes first and second on-off switches 1214, 1216 electrically disposed in series with respect to each other and between the power supply 1212 and the solenoid valve 1184. The first on-off switch 1214 is operable (e.g., actuatable between an electrically open and an electrically closed position) by the driver using his or her hand, and the second on-off switch 1216 is operable by the driver using his or her foot.

As will be explained further below, for power to be supplied to the solenoid valve 1184, both the first and the second on-off switches 1214, 1216 must be in an electrically closed position. However, as long as one of the switches 1214, 1216, is maintained in an electrically closed position, the other of the switches 1214, 1216 may be selectively actuated to regulate the delivery of power to the solenoid valve 1184 during operation of the traffic observation system 1156. In certain modified versions (not shown) of the traffic observation system 1156, the first and second switches 1214, 1216 are arranged in parallel with respect to each other. As such, with respect to such modified versions of the traffic observation system 1156, as long as one of the switches 1214, 1216 is maintained in an electrically open position, the other of the switches 1214, 1216 may be selectively actuated to regulate the delivery of power to the solenoid valve 1184.

Figure 11:
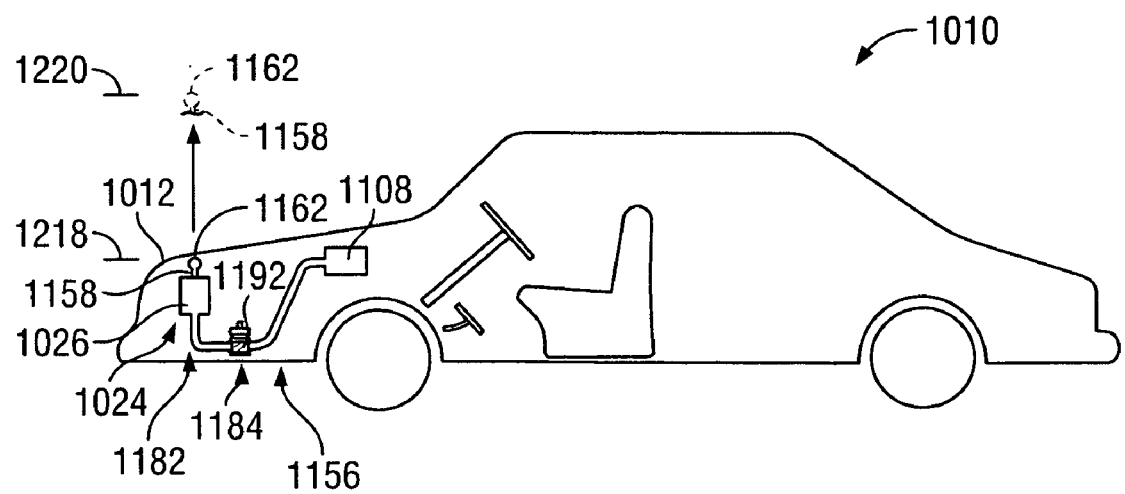
FIG. 11 is a view identical to FIG. 8, except that the reflection member of the traffic observation system is shown in a retracted or non-deployed state.

While not in use, the reflection member 1158 of the traffic observation system 1156 remains substantially retracted within the base member 1026 of the telescoping unit 1024, as shown in FIG. 11. When the reflection member 1158 is in such a retracted position, the mirror 1162 can be stored entirely within the front end 1012 of the automobile 1010 (e.g., it may remain underneath a front quarter panel of the automobile 1010, and/or under the automobile's hood, etc.). Other storage positions for the mirror 1162 are possible, including storage positions external to the front end 1012 of the automobile 1010.

Referring to FIGS. 8–11, in operation, the pressurized air source 1108 provides a supply of pressurized air to the compressed air inlet 1194 of the solenoid valve 1184, but when the plunger 1192 of the solenoid valve 1184 is seated in the valve seat 1188 (see FIG. 11), the compressed air inlet 1194 of the valve seat 1188 is sealed by the plunger 1192, preventing pressurized air from reaching the base member 1026 of the telescoping unit 1024. The driver, seeking to deploy the reflection member 1158, actuates either or both of the first and second on/off switches 1214, 1216 so as to open the solenoid valve 1184. The plunger 1192 of the solenoid valve 1184 responds by retracting into the upper portion 1198 of the reciprocation chamber 1190 (see FIG. 9) and away from the valve seat 1188. By retracting away from the valve seat 1188, the plunger 1192 permits pneumatic communication between the first and second conduit portions 1204, 1206, thereby permitting the conduit 1182 to deliver pressurized air to the base member 1026 of the telescoping unit 1024. Also, by retracting into the upper portion 1198, the plunger 1192 seals the bleed air inlet 1200 to the upper portion 1198 of the reciprocation chamber 1190, thereby preventing pressurized air from bleeding away from the base member 1026 of the telescoping unit 1024.

The telescoping unit 1024 now being subject to pressurization from the pressurized air source 1108, an intermediate member 1028 (see FIG. 9) of the telescoping unit 1024 extends outward of and upward from the base member 1026, an inner member 1030 (see FIG. 9) of the telescoping unit 1024 extends outward of and upward from the intermediate member 1028, and the reflection member 1158 of the traffic observation system 1156 extends outward of and upward from the inner member 1030 of the telescoping unit 1024. The mirror 1162, being coupled to the end 1160 of the reflection member 1158, is thus moved from a first elevation 1218 (see FIG. 11) relative to the automobile 1010, (e.g., an elevation roughly equivalent to that of the top of the base member 1026 of the telescoping unit 1024, as shown in FIG. 11), to a second elevation 1220 (see FIGS. 8 and 11) higher than the first elevation 1218 (e.g., higher by a distance roughly equivalent to the combined heights of the intermediate and inner members 1028, 1030 of the telescoping unit 1024, plus the height of the reflection member 1158, as shown in FIG. 8).

Since it is attached to the automobile 1010 via the base member 1026 of the telescoping unit 1024, the mirror 1162 is positioned at a forward location proximate to the front end 1012 of the automobile 1010 (e.g., the mirror 1162 can therefore be located well forward of the driver's station 1152 (see FIG. 8) of the automobile 1010). In addition, since the mirror 1162 can be raised to the second elevation 1220 as described above, the mirror 1162 can be positioned at a relatively high vantage point. As shown in FIG. 10, either such forward positioning or such elevated positioning, and/or a combination of both, causes the mirror 1162 to be positioned along a direct line of sight 1222, 1224 of the approaching vehicles 1176, 1178. Further, the mirror 1162 is advantageously oriented so as to receive light rays comprising an image of one or more of the approaching vehicles 1176, 1178, and to reflect that image to the driver. As a result, the driver is permitted to see a reflected image of an approaching vehicle 1176, 1178 (e.g., the driver sees the approaching vehicle 1176, 1178 indirectly) that he or she would not be able to see directly, from the vantage point of the driver's station 1152.

Regarding subsequent retraction of the reflection member 1158, when either or both of the first or second on-off switches 1214, 1216 (see FIG. 9) are thereafter opened, the solenoid valve 1184, being biased closed, automatically assumes its closed configuration (see FIG. 11). This closes the conduit 1182 and cuts the telescoping unit 1024 off from pressurized air from the pressurized air source 1108. The plunger 1192 (see FIG. 9) of the solenoid valve 1184, since it is caused to move into the valve seat 1188, passes out of the upper portion 1186 of the reciprocation chamber 1190. This permits any compressed air within the second conduit portion 1206 to escape through the pressure relief line 1208, and through the bleed air inlet 1200, into the reciprocation chamber 1198, and to pass therefrom to atmosphere via the bleed air outlet 1202. Since the telescoping unit 1024 is simultaneously deprived of pressurized air from the pressurized air source 1108, the inner and intermediate members 1028, 1030 of the telescoping unit 1024 retract downward into the base member 1026. Similarly, the reflection member 1158 retracts downward into the inner member 1030 of the telescoping unit 1024. This causes the mirror 1162 to reassume its first elevation 1218 (see FIG. 11) relative to the automobile 1010, from which it may be deployed again at any future time at the discretion of the driver (e.g., when needed again to provide a better vantage point for viewing approaching vehicles 1176, 1178 (FIG. 10)).

It should be noted that the traffic observation system 1156 can have numerous variations and modifications. For instance, the telescoping unit 1024 can be mounted anywhere on the automobile 1010, provided the mirror 1162 of the reflection member 1158 can be seen by the driver of the automobile 1010. The telescoping unit 1024 can also be mounted in different orientations (e.g., so as to extend in a horizontal or vertically downward direction). In addition, more than one telescoping unit 1024 can be mounted on the automobile 1010. Moreover, the mirror 1162 can be replaced by other imaging devices configured to receive light waves (e.g., in the form of visible images) from approaching vehicles, such as a still or video camera (e.g., including such cameras as operate in the infrared spectrum so as to permit observation in low light conditions), and the traffic observation system 1156 may accordingly include one or more displays (e.g., an LCD display) for viewing by the driver. Alternatively, the mirror 1162 can be replaced by one or more other devices configured to receive light and/or sound waves (e.g., a photo detector, an optical (e.g., laser) rangefinder, a sonic (e.g., doppler-type) sensor) and, in response thereto, to provide information regarding approaching vehicles 1176, 1178 (FIG. 10) to the driver in the form of one or more appropriate signals (e.g., an audible signal). The traffic observation system 1156 can also utilize other mechanisms to extend and/or retract the telescoping unit 1024 (e.g., a mechanical system, a vacuum system, an electrical system, etc.), and other mechanisms to urge (i.e., elevate and/or lower) the reflection member 1158 (e.g., including a fixed post or rail (not shown) along which the reflection member 1158 rides, or using an elongated unitary reflection member (not shown) extendable outward from within the automobile 1010).

Figure 12:
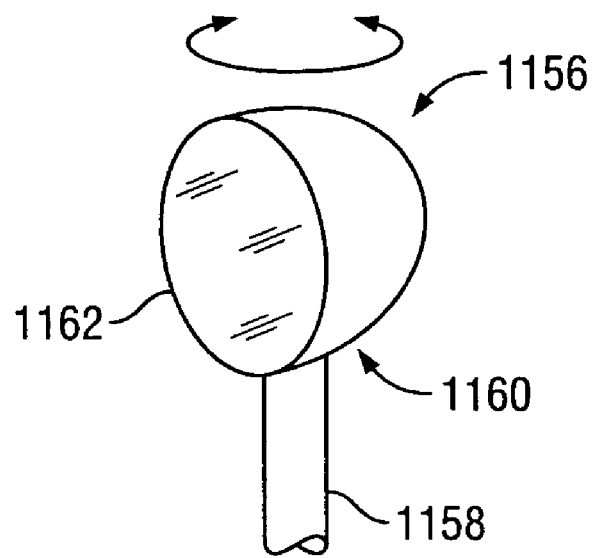
FIG. 12 is a cutaway view of a first variation of the reflection member of the traffic observation system shown in FIG. 8.
Figure 13:
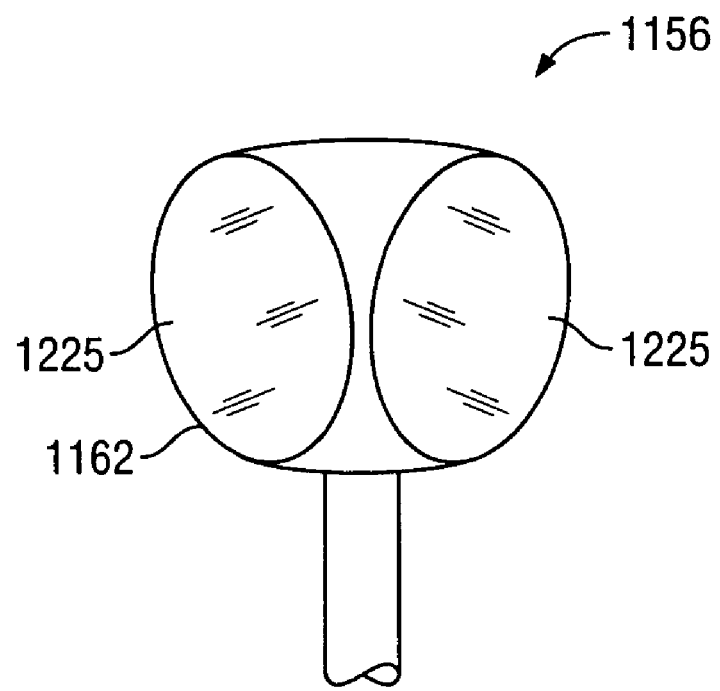
FIG. 13 is a cutaway view of a second variation of the reflection member of the traffic observation system shown in FIG. 8.

As an additional feature, and as shown in FIG. 12, the traffic observation system 1156 may be configured (e.g., via an electric motor) so as to permit the driver to rotate the mirror 1162 disposed at the end 1160 of the reflection member 1158. Moreover, at least a portion of the mirror 1162 may have a curved and/or wide-angle configuration so as to increase the driver's field of view for observation of objects via the mirror 1162. Referring to FIG. 13, the mirror 1162 of the traffic observation system 1156 may include two or more mirror portions 1225 facing in different directions. Accordingly, the traffic observation system 1156 can be configured to permit indirect viewing of vehicles 1176, 1178 (FIG. 10) approaching from either the left or the right side of the automobile 1010, at the discretion of the driver, or from both sides simultaneously.

A third exemplary embodiment of the present invention is illustrated in FIGS. 14 and 15. Elements illustrated in FIGS. 14 and 15 which correspond substantially to the elements described above with reference to FIGS. 1–13 have been designated by corresponding reference numerals increased by one thousand. The embodiment of the present invention shown in FIGS. 14 and 15 operates and is constructed in manners consistent with the foregoing description of the embodiments of FIGS. 1–13 unless it is stated otherwise.

Referring to FIG. 14, there is shown in cutaway view an automobile 2010 including a mirror housing 2226. The mirror housing 2226 has a construction and an operation similar to conventional external side-mounted rear-view mirrors such as are commonly mounted to a driver's side front door, or a passenger's side front door. For example, the mirror housing 2226 includes an extension 2228 via which the mirror housing 2226 is mounted to a side body portion 2230 of the automobile. The automobile 2010 further includes a turn indication system 2232 constructed in accordance with the present invention, including an indicating member 2234 mounted to the mirror housing 2226 (e.g., within the mirror housing 2226) for relative motion with respect thereto, and an actuation system 2180 for selectively urging the indicating member 2234, thereby causing the indicating member 2234 to move relative to the mirror housing 2226.

The indicating member 2234 includes a base 2236, and two limbs 2238 extending from the base 2236, each limb 2238 having a free end 2240 at which is disposed an indicator light 2242. The actuation system 2180 of the turn indication system 2232 includes a pneumatically-driven linear actuator 2244 constructed and operated in manners substantially similar to conventional linear actuators. For instance, the linear actuator 2244 includes a pressure chamber 2246 having a pressurization inlet 2248, a return spring 2250, and a piston 2252 having a head 2254 disposed in the pressure chamber 2246 for reciprocal motion with respect thereto, responsive to pressurized air entering the pressure chamber 2246 via the pressurization inlet 2248, and/or responsive to a biasing force from the return spring 2250. The piston 2252 further includes a shaft 2256 extending out from the pressure chamber 2246 and having an end 2258. The end 2258 of the shaft 2256 and the base 2236 of the indicating member 2234 are attached via a coupling 2260 such that the linear actuator 2244 is configured to urge the indicating member 2234 relative to the mirror housing 2226 via reciprocal motion of the piston 2254 relative to the pressure chamber 2246. As shown in FIG. 14, the linear actuator 2244 and the indicating member 2234 can be mounted to the mirror housing 2226 such that the piston 2254 and the indicating member 2234 can assume a retracted position substantially and/or completely inside the mirror housing 2226.

The actuation system 2180 further includes a conduit 2182 having first and second conduit portions 2204, 2206, a pressure relief line 2208, a solenoid valve 2184, a pressurized air source 2108, and a power supply circuit 2210 within the automobile 2010. The power supply circuit 2210 has a power source 2212, a hand-operated on-off switch 2214, and a relay 2262 arranged in series with the on-off switch 2214. The relay 2262 has a construction and functionality similar to conventional relays, and is configured and mounted to the automobile 2010 so as to automatically open (i.e., deenergize) the power circuit 2210 in response to a turn of the automobile 2010 being completed (e.g., via the driver straightening the steering wheel at the end of a turn). In one or more variations of the turn indication system 2232, the on-off switch 2214 is actuated via the driver operating (e.g., displacing, pushing, etc.) a conventional turn signal lever (not shown) located adjacent the vehicle steering wheel (also not shown).

Referring to FIGS. 14 and 15, in operation, the pressurized air source 2108 provides a supply of compressed air to the solenoid valve 2184, and the driver actuates the on/off switch 2214, so as to open the solenoid valve 2184. The pressure chamber 2246 of the linear actuator 2244 now being subject to pressurization from the pressurized air source 2108, the piston 2254 extends outward relative to the pressure chamber 2246, thereby urging the indicating member 2234 from a retracted position relative to the mirror housing 2226 as shown in FIG. 14 to a deployed position relative thereto as shown in FIG. 15. As shown in FIG. 15, when the indicating member 2234 is deployed, the ends 2240 of the limbs 2238 are extended laterally outward and away from the mirror housing 2226 (as well as outward and away from the side body portion 2230 of the automobile 2010). While the ends 2240 of the limbs 2238 are so extended, and/or during times when the ends 2240 of the limbs 2238 are moving relative to the mirror housing 2226, the indicator lights 2242 are illuminated (e.g., caused to blink intermittently in the manner of a conventional turn signal light). As a result, onlookers and other drivers are made aware of an intention on the part of the driver of the automobile 2010 to change an azimuthal orientation of the automobile 2010 (e.g. if the automobile 2010 is at rest) and/or a direction of travel of the automobile 2010 (e.g. if the automobile 2010 is moving). Additionally, should the indicating member 2234 strike an object the automobile 2010 is passing, or be struck by an object that is passing the automobile 2010, the coupling 2260 between the base 2236 and the shaft 2256 is flexible and/or releasable so as to permit the base 2236 to move (e.g., rotate) relative to the shaft 2256, and/or to become replaceably dislodged from the shaft 2256. This limits and/or prevents accidental damage to the automobile 2010, the object, and/or the turn indication system 2232.

At the completion of the turn, the relay 2262 is thrown automatically. This deenergizes the solenoid valve 2184, causing it to seal the conduit 2182 (see FIG. 14), and permits pressurized air to bleed from the pressure chamber 2246 of the linear actuator 2244. Since the linear actuator 2244 is now deprived of pressurized air, the return spring 2250 of the linear actuator 2244 moves the piston head 2254 inward relative to the pressure chamber 2248, along with the shaft 2256 of the piston 2252. Accordingly, the indicating member 2234 is moved inward relative to the mirror housing 2226 such that the ends 2240 of the limbs 2238 retract inside the mirror housing 2234 (see FIG. 14). In addition, the indicator lights 2242 are extinguished.

Figure 16:
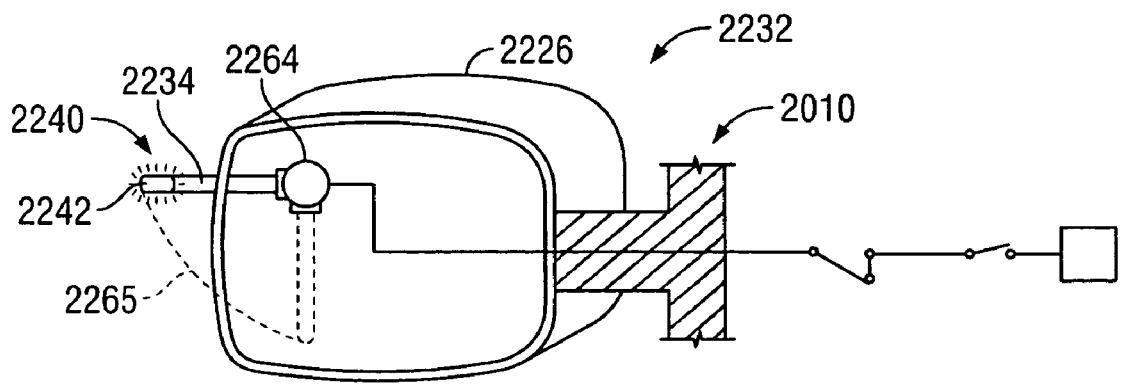
FIG. 16 is a schematic view of a modified version of the vehicle turn indication system shown in FIG. 14.

It should be noted that the turn indication system 2232 can have numerous variations and modifications. For instance, the indication member 2234 can have fewer or greater than two limbs 2238 and/or two indicator lights 2242. Also, the indicating member 2234, rather than retracting within the mirror housing 2226, may be mounted externally relative to the mirror housing 2226, and may retract (also externally) such that the ends 2240 of the limbs 2238 are caused to retract within an outline of the mirror housing 2226 (e.g., within an outline of the mirror housing 2226 as viewed from in front of or behind the automobile 2010). Further, the indicating member 2234 can be extended at least partially vertically (e.g., upward or downward) and/or positioned at other locations on the automobile 2010 than in or near a mirror housing 2226. Still further, and as in the variation of the turn indication system 2232 of the automobile 2010 as shown in FIG. 16, the linear actuator 2244 (FIG. 14) may be replaced with another type of actuator, e.g., a rotation-inducing actuator 2264 mounted within the mirror housing 2226 and that deploys the indicating member 2234 by swinging it vertically upward and outward of the mirror housing 2226, thereby causing the end 2240 and the indicator light 2242 to move through an arcuate path 2265. Moreover, rather than pneumatic actuation, other types of actuation can be employed, e.g., motor-driven (e.g., via an electric motor, as in FIG. 16) hydraulic, and/or magnetic, etc.

Figure 17:
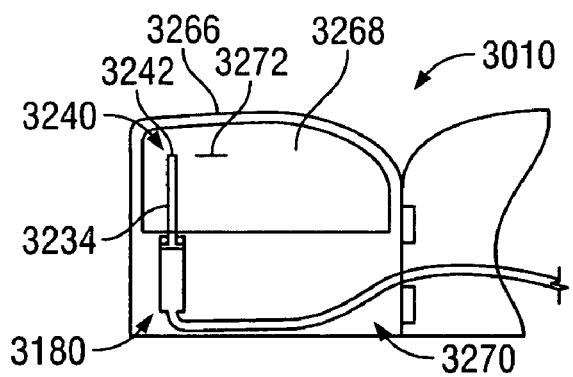
FIG. 17 is a partial view of an automobile equipped with a door-ajar indication system in accordance with the present invention.
Figure 18:
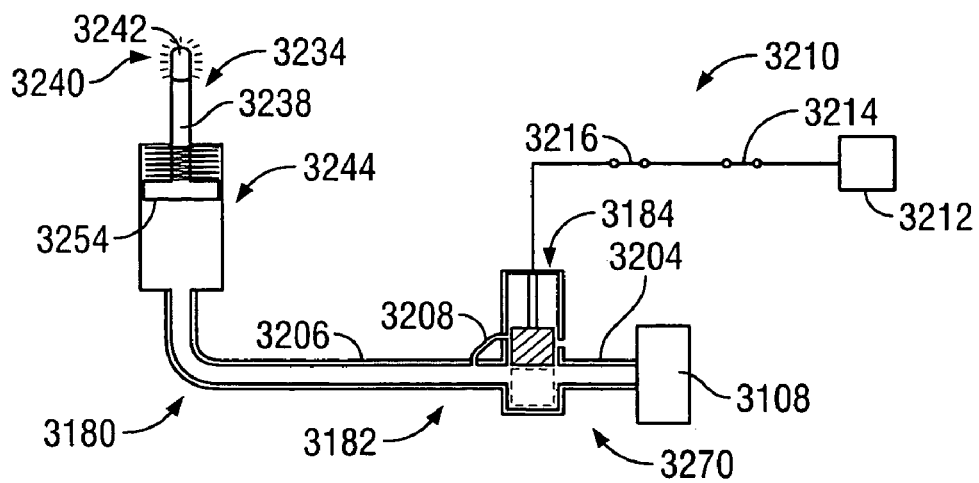
FIG. 18 is a schematic view of the door-ajar indication system shown in FIG. 17.

A fourth exemplary embodiment of the present invention is illustrated in FIGS. 17 and 18. Elements illustrated in FIGS. 17 and 18 which correspond substantially to the elements described above with reference to FIGS. 1–16 have been designated by corresponding reference numerals increased by one thousand. The embodiment of the present invention shown in FIGS. 17 and 18 operates and is constructed in manners consistent with the foregoing description of the embodiments of FIGS. 1–16 unless it is stated otherwise.

Referring to FIG. 17, there is shown in cutaway view of an automobile 3010 having a conventional door 3266 for admitting and/or discharging passengers and/or the driver of the automobile 3010, the door 3266 including a conventional window opening 3268. The automobile 3010 is equipped with a door-ajar indication system 3270 mounted at least in part to the door 3266. More particularly, the door-ajar indication system 3270 includes an indication member 3234 having an end 3240, and including an indicator light 3242 disposed at the end 3240 of the indication member 3234 for indicating to drivers of other vehicles and/or other onlookers that the door 3266 is ajar.

As will be discussed further hereinafter, the indication member 3234 is movably mounted to the door 3266, and the door-ajar indication system 3270 further includes an actuation system 3180 for selectively urging the indicating member 3234 relative to the door. In response to the door 3266 becoming ajar, the end 3240 of the indication member 3270 is moveable from a first elevation (not separately shown) relative to the door 3266 below the window opening 3268 to a second elevation 3272 relative to the door 3266 such that the end 3240 is visible through the window opening 3268 (e.g., such that the end 3240 is at the same elevation as the window opening 3268). As such, when the end 3240 of the indication member 3234 is at the second elevation 3272, the end 3240, and/or the indicator light 3242 disposed thereon, can be seen by observers located on either side of the door 3266 (e.g., if necessary, the end 3240 of the indication member 3234 can be viewed through a closed window (not separately shown) occupying the window opening 3268) so as to indicate to such observers that the door 3266 is in an ajar condition. Such an indication can be especially helpful at night, for example, and/or in instances when the automobile 3010 is parked on the shoulder of a highway, and the door 3266 needs to be opened in the direction of passing traffic, and/or needs to remain open for an extended time.

Referring to FIG. 18, the actuation system 3180 includes a pneumatically-driven linear actuator 3244, a conduit 3182 having first and second conduit portions 3204, 3206, a pressure relief line 3208, a solenoid valve 3184, and a pressurized air source 3108. The actuation system 3180 further includes a power supply circuit 3210 within the automobile 3010 (FIG. 17) having a power source 3212, a first hand-operated on-off switch 3214, and a second on-off switch 3216 arranged in series with the first on-off switch 3214. The indicating member 3234 is incorporated within the linear actuator 3244 such that the limb 3238 of the indicating member 3234 is coupled directly to a piston head 3254 of the linear actuator and functions as the piston shaft of the linear actuator 3244. The second on-off switch 3216 is configured and mounted to the automobile 3010 (FIG. 17) so as to become actuated in response to the door 3266 (FIG. 17) becoming ajar.

Referring to FIGS. 17 and 18, in operation, the indicating member 3234 is normally positioned such that the end 3240 of the indicating member 3234 is at the first elevation (not shown) below an elevation of the window opening 3268. In the event the door 3266 is opened, the second on-off switch 3216 becomes actuated and the actuation system 3180, now powered by the power supply 3212, elevates the indicating member 3234. The end 3240 of the indicating member 3234 is elevated thereby to the second elevation 3272, and the indicator light 3242 is illuminated to provide the door ajar signal. The indicating member 3234 can be retracted by closing the door 3266, thereby actuating/opening the second on-off switch 3216, and/or by the driver actuating/opening the first on/off switch 3214.

It should be noted that the door ajar indication system 3270 can have numerous variations and modifications. For example, the linear actuator 3244 may include a piston shaft (not shown) coupled to the limb 3238 of the indicating member 3234, such that the limb 3238 is not incorporated within the linear actuator (e.g., see the turn indicating system 2232 shown and described with reference to FIGS. 14 and 15). Also, the end 3240 of the indicating member 3234 can be moved in other directions (e.g., laterally, downwards, etc.) so as to coincide with the window opening 3268 for permitting viewing of the end 3240, and/or light from the indicator light 3242, therethrough. Further, the second on-off switch 3216 can be omitted, such that actuation of the linear actuator 3244 is performed not necessarily upon the door 3266 becoming ajar, but rather at the discretion of the driver via the first on/off switch 3214. Still further, the indicating member 3234 can be moved by actuators other than linear actuators (e.g., via a rotating actuator) and/or by actuators that are driven other than pneumatically (e.g., electrically, magnetically, etc.).

It will be understood that the embodiments described herein are merely exemplary and that a person skilled in the art may make many variations and modifications without departing from the spirit and scope of the invention. All such variations and modifications, including those discussed above, are intended to be included within the scope of the invention as defined in the appended claims.

I claim:

1. A turn indication system for a vehicle, comprising a housing; and an indicating member movable in a linear path between a first position, in which said indicator member is retracted into said housing, and a second position, in which said indicating member projects outwardly from said housing, said indicating member being movable from said first position toward said second position in response to the actuation of a turn signal switch so as to indicate a change to a direction of movement of a vehicle.

2. The turn indication system of claim 1, further comprising pneumatic actuation means for moving said indicating member between said first and second positions.

3. The turn indication system of claim 2, wherein said actuation means includes a pneumatically driven actuator coupled to said indicating member.

4. The turn indication system of claim 3, wherein said actuator includes a pressure cylinder and a piston which is movably mounted in said cylinder and coupled to said indicating member.

5. The turn indication system of claim 4, wherein said actuation means includes a source of pressurized fluid and a conduit for delivering pressurized fluid from said source to said pressure cylinder.

6. The turn indication system of claim 5, wherein said actuation means includes a valve disposed between said source and said pressure cylinder, said valve being movable between an open position, in which it permits passage of pressurized fluid through said conduit, and a closed position, in which it inhibits passage of pressurized fluid through said conduit.

7. The turn indication system of claim 6, wherein said actuation means includes a power switch configured so as to be selectively actuated by a driver of the vehicle so as to cause said valve to move from its said closed position to its said open position.

8. The turn indication system of claim 7, wherein said actuation means includes a relay for deactivating said valve in response to a completion of a turn of the vehicle so as to move said valve from its said open position to its said closed position.

9. The turn indication system of claim 1, wherein said indicating member includes an end portion, said end portion being positioned completely within said housing when said indicating member is in its said first position, said end portion being positioned outside of said housing when said indicating member is its said second position.

10. The turn indication system of claim 9, further comprising an externally mountable housing for a mirror for providing a rear view to a driver of the vehicle, said indicating member being movably mounted to said externally mountable housing such said indicating member is retracted completely into said externally mountable housing when said indicating member is in its said first position.

11. The turn indication system of claim 10, wherein said indicating member includes an indicator light attached to said end portion such that said indicator light is positioned outside of said externally mounted housing when said indicating member is in its said second position.

12. A mirror apparatus for a vehicle for providing a rear view to a driver of the vehicle, comprising a housing mounted externally to the vehicle; a mirror housed in said housing; and an indicating member movable in a linear path between a first position, in which said indicator member is retracted into said housing, and a second position, in which said indicating member projects outwardly from said housing, said indicating member being movable from said first position toward said second position in response to the actuation of a turn signal switch so as to indicate a change to a direction of movement of the vehicle.

13. The apparatus of claim 12, further comprising pneumatic actuation means for moving said indicating member between its said first and second positions.

14. The apparatus of claim 13, wherein said actuation means includes a pneumatically driven actuator coupled to said indicating member.

15. The apparatus of claim 12, wherein said indicating member includes an end portion, said end portion being positioned completely within said housing when said indicating member is in its said first position, said end portion being positioned outside of said housing when said indicating member is its said second position.

* * * * *